US010333940B2

(12) United States Patent
Zhang et al.

(10) Patent No.: US 10,333,940 B2
(45) Date of Patent: Jun. 25, 2019

(54) DATA TRANSMISSION METHOD AND APPARATUS

(71) Applicant: Yulong Computer Telecommunication Scientific (Shenzhen) Co., Ltd., Shenzhen, Guangdong (CN)

(72) Inventors: Chenlu Zhang, Guangdong (CN); Kewen Yang, Guangdong (CN)

(73) Assignee: Nanchang Coolpad Intelligent Technology Company Limited, Nanchang, Jiangxi (CN)

( * ) Notice: Subject to any disclaimer, the term of this patent is extended or adjusted under 35 U.S.C. 154(b) by 336 days.

(21) Appl. No.: 15/370,161

(22) Filed: Dec. 6, 2016

(65) Prior Publication Data
US 2017/0085573 A1 Mar. 23, 2017

Related U.S. Application Data

(63) Continuation of application No. PCT/CN2014/087835, filed on Sep. 29, 2014.

(30) Foreign Application Priority Data

Jun. 9, 2014 (CN) .......................... 2014 1 0253836

(51) Int. Cl.
*H04W 4/70* (2018.01)
*H04W 8/18* (2009.01)
(Continued)

(52) U.S. Cl.
CPC .......... *H04L 63/101* (2013.01); *H04L 67/104* (2013.01); *H04W 4/70* (2018.02);
(Continued)

(58) Field of Classification Search
None
See application file for complete search history.

(56) References Cited

U.S. PATENT DOCUMENTS 9,554,406 B2 * 1/2017 Lin ........................ H04W 76/14
9,655,156 B2 * 5/2017 Guo ...................... H04W 76/14
(Continued)

FOREIGN PATENT DOCUMENTS

CN 101296190 A 10/2008
CN 101330440 A 12/2008
(Continued)

OTHER PUBLICATIONS

Gunes et al, "Hybrid model for LTE Network-Assisted D2D communications", 2015, p. 1-14.*
(Continued)

*Primary Examiner* — Christopher A Revak
(74) *Attorney, Agent, or Firm* — Young Basile Hanlon & MacFarlane, P.C.

(57) ABSTRACT

The present disclosure provides a data transmission method, including: upon receipt of a service request, it is determined whether said service request is a data sharing request; if the determined result is that said service request is a data sharing request, then the data source node and data-receiving destination node corresponding to said data sharing request are determined; according to the distance principle and/or signal quality principle and the credit principle and/or incentive principle, a bearer network node is selected corresponding to said data source node and said data-receiving destination node; according to said bearer network node, data source node, and data-receiving destination node, the data sharing network structure is determined. The technical solution of the present disclosure resolves the trust and incentive problem in terminal direct-connection communication networks, increasing security in the sharing of data.

18 Claims, 6 Drawing Sheets

(51) Int. Cl.
*H04L 29/06* (2006.01)
*H04L 29/08* (2006.01)
*H04W 12/02* (2009.01)
*H04W 76/14* (2018.01)

(52) U.S. Cl.
CPC ............. *H04W 8/18* (2013.01); *H04W 12/02* (2013.01); *H04W 76/14* (2018.02)

(56) References Cited

U.S. PATENT DOCUMENTS

| | | | |
|---|---|---|---|
| 2013/0288668 | A1 | 10/2013 | Pragada et al. |
| 2014/0010172 | A1* | 1/2014 | Wei ....................... H04W 76/14 370/329 |
| 2014/0010209 | A1* | 1/2014 | Hakola ................. H04W 24/02 370/336 |
| 2014/0079218 | A1 | 3/2014 | Cheng et al. |
| 2014/0211705 | A1* | 7/2014 | Baek ................... H04W 76/023 370/329 |
| 2015/0036495 | A1* | 2/2015 | Venkatachalam ....... H04W 4/70 370/235 |
| 2015/0201452 | A1* | 7/2015 | Wang .................... H04W 8/005 455/426.1 |
| 2016/0227496 | A1* | 8/2016 | Panteleev ............. H04W 76/18 |
| 2017/0188404 | A1* | 6/2017 | Fodor ................... H04W 76/14 |
| 2018/0054725 | A1* | 2/2018 | Agiwal ................ H04W 8/005 |

FOREIGN PATENT DOCUMENTS

| | | |
|---|---|---|
| CN | 102571856 A | 7/2012 |
| CN | 103179575 A | 6/2013 |
| CN | 103533500 A | 1/2014 |
| CN | 104009998 A | 8/2014 |
| CN | 104010300 A | 8/2014 |
| CN | 104010385 A | 8/2014 |
| GB | 2469469 A | 10/2010 |

OTHER PUBLICATIONS

Idris et al., "A Market-Managed Topology Formation Algorithm for Peer-to-Peer File Sharing Networks", Jan. 1, 2006 (Jan. 1, 2006), Performability Has Its Price Lecture Notes in Computer Science;; LNCS, Springer, Berlin, DE, pp. 61-77, XP019035403, ISBN: 978-3-540-35456-7; Figure 1, pp. 61-67, and 75.
Altmann et al., "A P2P File Sharing Network Topology Formation Algorithm Based on Social Network Information", INFOCOM Workshops 2009, IEEE, IEEE, Piscataway, NJ, USA, Apr. 19, 2009 (Apr. 9, 2009), pp. 1-6, XP031473256, ISBN: 978-1-4244-3968-3; Figures 2-4, pp. 1-3 and 6.

* cited by examiner

DATA TRANSMISSION METHOD AND APPARATUS

CROSS-REFERENCE TO RELATED APPLICATION(S)

This application is a continuation of International Application No. PCT/CN2014/087835, filed on Sep. 29, 2014, which claims priority to Chinese patent application No. 20140253836.2, filed on Jun. 9, 2014, the disclosures of both of which are incorporated by reference in their entireties.

TECHNICAL FIELD

The present disclosure relates to communication technology field, and particularly to a data transmission method and an apparatus.

BACKGROUND

The introduction of Device-to-Device (D2D) communication technology provides technical support to improve spectrum efficiency, improve system throughput, reduce the energy consumption of a user device (also referred to as user equipment), and reduce the operating costs of operators. Research on the D2D communication technology has been launched in the current 3GPP network, in which a variety of application scenarios of the D2D communication technology has been defined. Current network side D2D communication technology research focus on methods for establishing a D2D communication network in the physical layer, for example, how to establish a D2D communication network between two user devices.

SUMMARY

According one aspect of the disclosure, it is provided a data transmission method, which includes: determining whether to adopt a D2D communication data transmission manner according to a service request received or triggered on the network side; if yes, determining a data source node and a data-receiving destination node corresponding to the service request; selecting a bearer network node corresponding to the data source node and the data-receiving destination node according to a physical domain network-selection principle and/or a business model domain network-selection principle; determining a network structure corresponding to the D2D communication data transmission manner according to the bearer network node, the data source node, and the data-receiving destination node.

In this technical scheme, after receiving or triggering a service request, the network side will determine whether to transmit data by establishing a D2D communication network. The service request includes data sharing request and general service request. Specifically, 1) For general service request, the network side determines whether there are nodes with the same service requirements, or whether there are shared networks with the same services, and then determining whether to establish a new or join an existing D2D communication network according to network (includes core network and access network) load condition. 2) For data sharing or transmitting request, determine whether to transmit data via the D2D communication manner according to network load condition. On the basis of the determination of a source user equipment (UE), that is, the data source node, and a receiving UE, that is, the data-receiving destination node, UEs that meet certain error rate and delay requirements can be selected according to the physical domain network-selection principle, and then UEs with higher security and credit rating can be selected according to the business model domain network-selection principle. Based on this, a D2D transmission data transmission network structure with higher safety factor and better data transmission performance can be determined, which can ultimately ensure the efficiency and security of information transmission, and effectively solve the trust and incentive problems in the D2D communication network.

Specifically, the physical domain network-selection principle includes but is not limited to distance principle and/or signal quality principle, /the business model domain network-selection principle includes credit principle and/or incentive principle. The credit principle used to determine the bearer network node includes: a credit relationship maintained on the network side and a credit relationship maintained on the terminal side.

In order to make an actual bearer network meet the credit principle, in accordance with the credit-based networking principle (that is, the credit principle), restrictive modification can be performed on a physical domain network topology according to the credit relationship maintained on the network side or the credit relationship maintained on the terminal side. If the credit principle is carried out on both sides, security and confidentiality indexes on the network side and the terminal side will be both raised and data leakage on both sides can be avoided, this will be helpful to improve the security of data sharing.

Preferably, the credit relationship maintained on the network side includes access control based on network subscription data and/or access control based on historical data.

In this technical scheme, the credit relationship maintained on the network side is maintained by a base station or a server such as a D2D communication strategy and management server on the network side; the main purpose thereof is to introduce access control based on operators. According to the access control based on network subscription data and/or access control based on historical data, the network side can determine whether a node can be allowed to be responsible for data transmission or data transfer in a P2P data sharing network based on D2D communication. Therefore, the security of data transmission is greatly improved, and security and confidentiality indexes on the network side and the terminal side can be raised, thus avoiding data leakage on the network side and the terminal side.

Preferably, the access control based on network subscription data is to determine whether a terminal has been signed and can be used as a relay node (such as repeater) for data transmission in a network upon network signing of the user of the terminal; if yes, the terminal will be defined as a trusted node, otherwise, the terminal will be defined as an un-trusted node. The access control based on historical data is to track and record the user behavior of the terminal continuously by the network side, and evaluate the credit rating of the user comprehensively according to the information recorded; if the credit rating meets a preset threshold value, the terminal will be defined as a trusted node by the network side, otherwise, the terminal will be defined as an un-trusted node.

Specifically, the trusted node is allowed to undertake data relay service; in contrast, the un-trusted node is not allowed to undertake data relay service.

As mentioned above, in the access control based on network subscription data, upon network signing of the user of a terminal, it is determined that whether the terminal can be used as a repeater for data relaying in data transmission in the D2D communication network. The result of determination can be identified with 1 bit and can be obtained from a user signing database (such as HSS/HLR) in the process of authentication; a node identified as YES can be deemed as a trusted node if there is no prior information from other judgment rules. In the access control based on historical data, the user behavior, such as number of times, time length, and flow rate of data sharing relay service being performed, is tracked and recorded by the network side; the credit level of the user will be scored comprehensively according to the results of tracking and recording, and the terminal will be defined as a "trusted node" if the score thereof meets certain conditions; alternatively, trust priority can be defined according to the score and then relay selection can be performed according to the trust priority.

By determining whether a node can be used for data transmission based on a trust or un-trust judgment on the node, the security of data transmission can be enhanced greatly, and security and confidentiality indexes on the network side and the terminal side will be both raised, thus avoiding data leakage on the network side and the terminal side.

Preferably, the credit relationship maintained on the terminal side includes a relationship map maintained by terminal side upper applications and a relationship map provided by a network side application server.

The relationship map maintained by terminal side upper applications is provided by upper applications and is reported to the network side via signaling of an access network signaling plane; the network side will consider access restrictions when constructing a bearer network (that is, Hosted network).

The relationship map provided by a network side application server is established by terminal side upper applications, wherein map synchronization can be achieved between Application layer and the network side application server; when constructing the bearer network, the network side will request for the relationship map from the application server and access control will be conducted according to the relationship map information acquired.

In this technical scheme, the credit relationship maintained by the terminal side includes maintenance of the terminal side upper applications and background maintenance of a dedicated server of the network side which is reported to the server side by the terminal, and the main purpose thereof is to introduce a credit mechanism based on certain user-specific information. The relationship map maintained by terminal side upper applications is provided by upper applications and is reported to the network side via signaling of access network signaling plane; the network side will consider access restrictions when constructing a bearer network. In the relationship map, credit priority can be defined for each object according to the credit relationship, and objects will be selected according to priority order when considering relay. For the relationship map provided by application servers of the network side, it is established by the terminal side upper applications, and map synchronization can be achieved between Application layer and the network side application server. When constructing the bearer network, the network side has to request the relationship map from the application server, and perform access control based on the information acquired.

For either relationship map described above, credit priority can be defined for each object according to the credit relationship, and objects will be selected according to priority order when considering relay.

In other words, the maintenance of credit relationship on the terminal side includes maintenance performed by the terminal side upper applications and background maintenance performed by a network side proprietary server, wherein the background maintenance is reported to the network side proprietary server by a terminal. The main purpose of the maintenance of the credit relationship is to introduce a credit mechanism based on some user specific information.

In this technical scheme, the incentive principle is as follows: the terminal side or the network side sets a preset incentive principle for data service, and a data transmission node will choose whether to undertake data relay service based on the preset incentive principle.

In this technical scheme, the networking principle based on reciprocity relationship and incentive relationship is a rewards and punishment mechanism established for supporting the D2D communication business mode. Specifically, an incentive principle is defined for the D2D communication data sharing service released by the terminal or the network; based on the incentive principle, a potential data transmission relay node can choose to undertake or not to undertake data relay service. For example, upon defining relay nodes for some D2D communication sharing service, it can be defined that some kind of rewards can be granted for each 1 Mbis data relay or each 1 minute data relay or each relay data transmission. For example, the rewards can be one of the following, but the disclosure is not limited thereto: enjoy a free relay service for 1 Mbis or 1 minute or one time offered by other users; N virtual integration will be granted for a relay node for each 1 Mbis data relay or each 1 minute data relay or each relay data transmission conducted; and the like. As a result, the incentive problem is well resolved, and the efficiency of data transmission is improved.

The process of choosing to undertake or not to undertake data relay service by the potential data transmission relay node based on the incentive principle can be as follows: the data transmission node sets a gain threshold, and chooses to undertake data relay service if the incentive principle corresponding to data service meets the gain threshold, otherwise, chooses not to undertake data relay service.

As can be seen from the above description, the potential data transmission relay node can define a gain threshold and is committed to provide relay service if the incentive released by the D2D communication data sharing service meets the gain threshold. The security of data transmission is improved via the setting of the gain threshold.

Preferably, the incentive principle further includes: setting a mutual group, and for any terminal therein, after undertaking a first preset number of times of data relay service, a first preset time of data relay service, or a first preset flow-rate of data relay service for other terminals, the other terminals will undertake a second preset number of times of data relay service, a second preset time of data relay service, or a second preset flow-rate of data relay service for the above-mentioned any terminal.

In this technical scheme, by joining the mutual group, the terminal, as a member of the mutual group, is committed to provide corresponding number of data relay service while obtaining data relay service from other members in the mutual group. For example, a terminal can commit to provide 1 Mbis or N Mbis relay service to other members for every 1 Mbis relay service obtained; or, the terminal can commit to provide 1 minute or N minutes relay service to other members for every 1 minute relay service obtained; or, the terminal can commit to provide one or N relay service to other members for every one relay service obtained. Each terminal in the mutual group is incentivized to transmit data, thus the efficiency of data transmission is improved.

In this technical scheme, terminals allowed to undertake data relay service will be added to a white list while terminals not allowed to undertake data relay service will be added to a black list. A destination terminal will be selected from the white list as a data receiving destination node.

Specifically, only the node in the white list is allowed to be used for data transfer and relay, in addition to this or alternatively, the node in the black list is not allowed to be used for data transfer and relay. Thus, the destination terminal can be selected from the white list directly; therefore, working efficiency is improved while the power consumption of the user and operating costs of the operators is saved.

In the technical scheme, the priority of terminals allowed to undertake data service will be set according to a setting command received. The destination terminal will be selected from the terminals allowed to undertake data service according to priority order. The destination terminal will be the data receiving destination node.

Specifically, based on a priority list defined at the terminal or the network, a node can be selected as a relay node according to the priority order. Therefore, the time it takes to select the relay node can be saved, the working efficiency can be improved, and the power consumption of the user and operating costs of the operators can be saved.

Alternatively, the destination terminal can be selected from the terminals allowed to undertake the data service according to a selecting command received. The destination terminal will be the data receiving destination node.

In the technical scheme described above, the user can choose whether to undertake data relay service according to the service information (such as the quantity and manner of incentive) transmitted via the network. Moreover, the network or the terminal can choose whether to undertake data relay service according to a preset rule and the service information transmitted via the network. For example, if the gain threshold is defined, the user will choose to undertake relay service automatically if the quantity of some service mechanism is higher than the gain threshold.

In conclusion, the technical solution of this disclosure resolves the trust and incentive problems in D2D communication networks; meanwhile, the efficiency of data transmission is improved, and the power consumption of the user and operating costs of the operators is saved.

DETAILED DESCRIPTION

Figure 1:
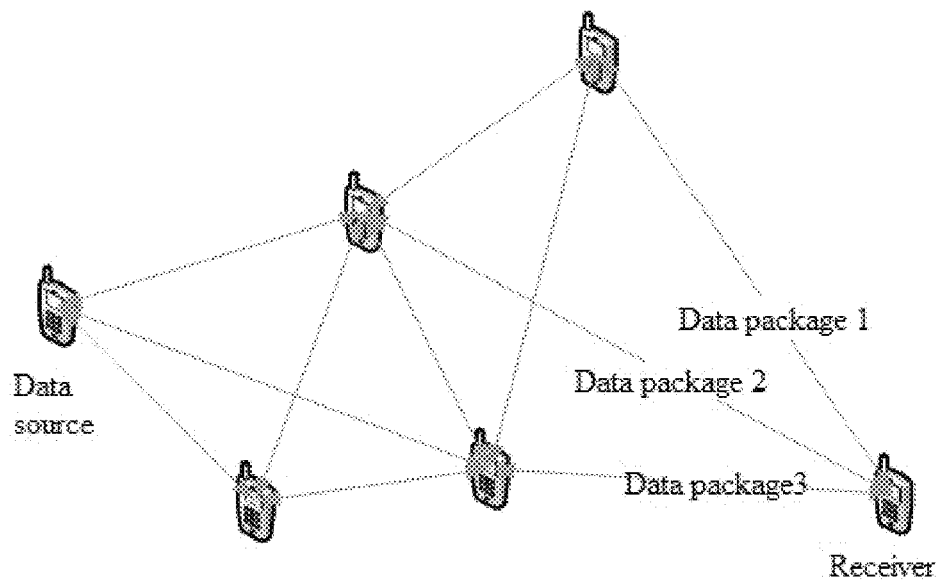
FIG. 1 is an application scenario of D2D communication assumed in the related art.

As shown in FIG. 1, a future application scenario has been proposed in the D2D communication technology research. In the scenario illustrated in FIG. 1, the D2D communication technology is combined with a Point-to-Point (P2P) network to achieve D2D Local Area Network (LAN) data sharing; as a result, data sharing and forwarding efficiency can be improved to a larger extent and the network side load can be reduced.

In the current 3GPP standardization process, the main concern is how to establish D2D communication between two user devices; it relies on an assumption that two devices meet physical conditions (for example, close enough) for establishing D2D communication can both realize D2D communication and does not take into account authentication and incentive problems of the user devices; that is, the security of the user devices in the D2D communication, the trustworthiness required for data transfer transmission, and potential business models for data transferring (in other words, incentive problems) have not yet been considered, and there is no realistic business model can support the implementation.

It is desirable to provide a new method to address the trust and incentive problems in D2D communication so as to enhance the security of data sharing.

Therefore, the present disclosure provides a novel technical scheme to address the trust and incentive problems in D2D communication, with which the security of data sharing can be enhanced.

In order to more clearly understand the above object, features, and advantages of the present disclosure, it will be described in further detail with refer to the accompanying drawings and the following implementations. It should be noted that, the implementations and the features thereof can be combined with each other without confliction.

In the following description, numerous specific details are set forth in order to fully understand the present disclosure, but the present disclosure can also be achieved in other ways different from the implementations described herein, therefore, the scope of the present disclosure is not limited to the following specific implementations.

In the following description, term "terminal" is often referred to as term "node" or "terminal node", and these terms can be used in exchange. Term "D2D communication" refers to "Device-to-Device communication" that enables direct communication between nearby mobiles.

Figure 2:
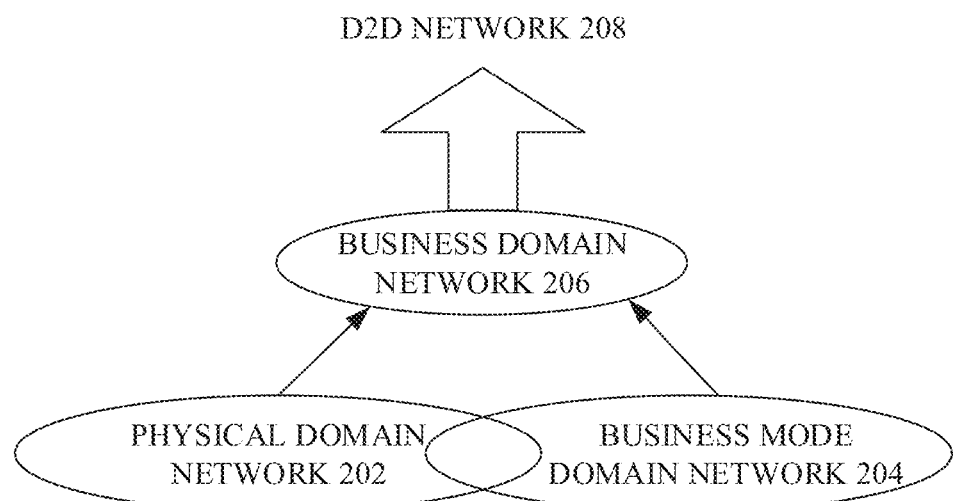
FIG. 2 is a diagram illustrating a D2D communication network model according to an implementation of the disclosure.

FIG. 2 is a diagram illustrating a D2D communication network model according to an implementation of the disclosure.

As shown in FIG. 2, a D2D communication network 208 includes a physical domain network 202, a business mode domain network 204, and a business domain network 206, via which a potential business mode and an access restriction method based on physical domain network topological structure can be provided. The above-mentioned three network domains describe D2D communication network establishing manners from three aspects of physical connection, business mode, and upper layer application structure respectively.

Specifically, the physical domain network 202 establishes a bottom D2D communication network which meets some bit-error rate and time delay requirements according to physical characteristics between D2D communication nodes. The business mode domain network 204 performs access control and node selection on the physical domain network 202 according to business mode domain restriction characteristics (such as credit and reciprocity principles) defined so as to form a bearer network which can meet some business mode. The business domain network 206 establishes a logical link network between a data source node and a data-receiving destination node.

After the service network topological structure information of the D2D communication network is formed on the network side according to a service request of the terminal, the network has in fact confirmed the position information of a node that needs to share data. According to the confirmation information and an existing networking principle such as a physical domain networking principle based on distance or based on signal strength/quantity, the physical layer can choose a physical domain topological structure as a bearer network for a business domain network. The physical domain only concerned about the efficiency and reliability of data transmission between D2D communication nodes; business mode related access principles such as credit, reciprocity, or incentive principle are not involved. Therefore, as to the physical domain network topological structure, access restrictions can be considered.

Figure 3:
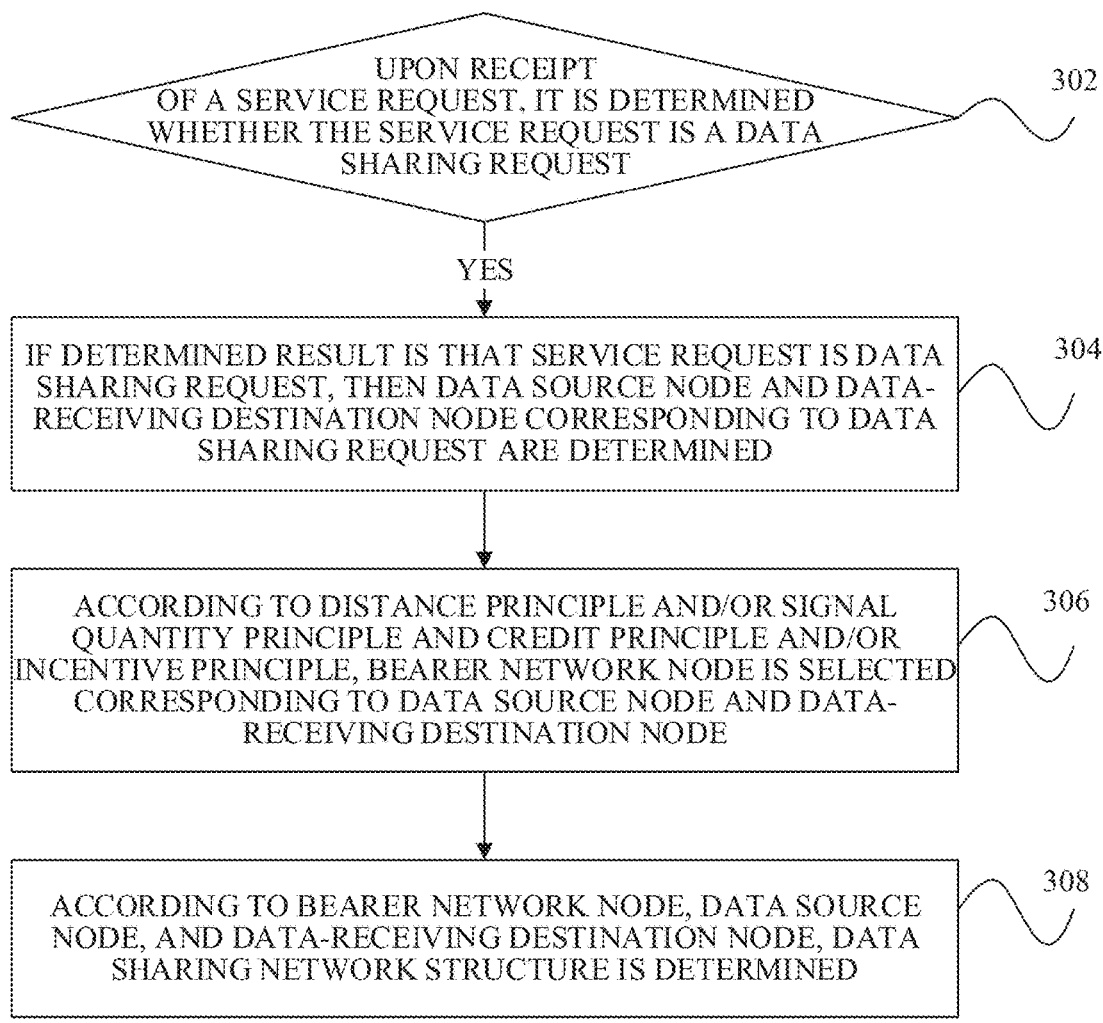
FIG. 3 is a flowchart illustrating a data transmission method according to an implementation of the disclosure.

FIG. 3 is a flowchart illustrating a data transmission method according to an implementation of the disclosure. As shown in FIG. 3, operations for the implementation of the method include operation 302-308:

Operation 302, determining whether to adopt a D2D communication data transmission manner according to a service request received or triggered on the network side; that is, upon receipt of a service request, it is determined whether the service request is a data sharing request; if yes, proceed to operation 304, otherwise, the process ends.

Operation 304, determining a data source node and a data-receiving destination node corresponding to the service request such as a data sharing request.

Operation 306, selecting a bearer network node corresponding to the data source node and the data-receiving destination node according to a distance principle and/or signal quantity principle and a credit principle and/or incentive principle; wherein the bearer network node is used to construct a bearer network.

Operation 308, determining a network structure corresponding to the D2D communication data transmission manner (that is, a data sharing network structure) according to the bearer network node, the data source node, and the data-receiving destination node.

In this technical scheme, after receiving or triggering the service request, the network side will determine whether to transmit data by establishing a D2D communication network. The service request includes data sharing request and general service request. 1) For general service request, the network side determines whether there are nodes with the same service requirements, or whether there are shared networks with the same services, and then determining whether to establish a new or join an existing D2D communication network according to network (includes core network and access network) load condition. 2) For data sharing or transmitting request, determine whether to transmit data via the D2D communication manner according to network load condition. On the basis of the determination of a source user equipment (UE), that is, the data source node, and a receiving UE, that is, the data-receiving destination node, UEs that meet certain error rate and delay requirements can be selected according to the physical domain network-selection principle, and then UEs with higher security and credit rating can be selected according to the business model domain network-selection principle. Based on this, a D2D transmission data transmission network structure with higher safety factor and better data transmission performance can be determined, which can ultimately ensure the efficiency and security of information transmission, and effectively solve the trust and incentive problems in the D2D communication network.

Specifically, the credit principle includes a credit relationship maintained on the network side and a credit relationship maintained on the terminal side.

In order to make an actual bearer network meet the credit principle, in accordance with the credit-based networking principle (that is, the credit principle) restrictive modification can be performed on a physical domain network topology according to the credit relationship maintained on the network side or the credit relationship maintained on the terminal side. If the credit principle is carried out on both sides, security and confidentiality indexes on the network side and the terminal side will be both raised and data leakage on both sides can be avoided, this will be helpful to improve the security of data sharing.

Preferably, the credit relationship maintained on the network side includes access control based on network subscription data and/or access control based on historical data.

In this technical scheme, the credit relationship maintained on the network side is maintained by a base station or a server such as a D2D communication strategy and management server on the network side; the main purpose thereof is to introduce the access control based on operators. According to the access control based on network subscription data and/or access control based on historical data, the network side can determine whether a node can be allowed to be responsible for data transmission or data transfer in a P2P data sharing network based on D2D communication. Therefore, the security of data transmission is greatly improved, and security and confidentiality indexes on the network side and the terminal side can be raised, thus avoiding data leakage on the network side and the terminal side.

Specifically, the bearer network node can be one of a trusted node or an un-trusted node. The trusted node is a node which is allowed to undertake data relay service; in contrast, the un-trusted node is a node which is not allowed to undertake data relay service.

Preferably, the access control based on network subscription data is to determine whether a terminal has been signed and can be used as a repeater for data transmission in a network upon network signing of the user of the terminal; if yes, the terminal will be defined as a trusted node, otherwise, the terminal will be defined as an un-trusted node. The access control based on historical data is to track and record the user behavior of the terminal continuously by the network side, and evaluate the credit rating of the user comprehensively according to the information recorded; if the credit rating meets a preset threshold value, the terminal will be defined as a trusted node by the network side, otherwise, the terminal will be defined as an un-trusted node.

As mentioned above, in the access control based on network subscription data, upon network signing of the user of a terminal, it is determined that whether the terminal can be used as a repeater for data relaying in data transmission in the D2D communication network. The result of determination can be identified with 1 bit and can be obtained from a user signing database (such as HSS/HLR) in the process of authentication; a node identified as YES can be deemed as a trusted node if there is no prior information from other judgment rules. In the access control based on historical data, the user behavior, such as number of times, time length, and flow rate of data sharing relay service being performed, is tracked and recorded by the network side; the credit level of the user will be scored comprehensively according to the results of tracking and recording, and the terminal will be defined as a "trusted node" if the score thereof meets certain conditions; alternatively, trust priority can be defined according to the score and then relay selection can be performed according to the trust priority.

By determining whether a node can be used for data transmission based on a trust or un-trust judgment on the node, the security of data transmission can be enhanced greatly, and security and confidentiality indexes on the network side and the terminal side will be both raised, thus avoiding data leakage on the network side and the terminal side.

Preferably, the credit relationship maintained on the terminal side includes a relationship map maintained by terminal side upper applications and a relationship map provided by a network side application server.

1) The relationship map maintained by terminal side upper applications is provided by upper applications and is reported to the network side via signaling of access network signaling plane; the network side will consider access restrictions when constructing a bearer network (that is, Hosted network).

2) The relationship map provided by a network side application server is established by terminal side upper applications, wherein map synchronization can be achieved between Application layer and the network side application server; when constructing the bearer network, the network side will request for the relationship map from the application server and access control will be conducted according to the relationship map information acquired.

For either relationship map described above, credit priority can be defined for each object according to the credit relationship, and objects will be selected according to priority order when considering relay.

In other words, the maintenance of credit relationship on the terminal side includes maintenance performed by the terminal side upper applications and background maintenance performed by a network side proprietary server, wherein the background maintenance is reported to the network side proprietary server by a terminal. The main purpose of the maintenance of the credit relationship is to introduce a credit mechanism based on some user specific information.

In this technical scheme, the incentive principle is as follows: the terminal side or the network side sets a preset incentive principle for data service, and a data transmission node will choose whether to undertake data relay service based on the preset incentive principle.

In this technical scheme, the networking principle based on reciprocity relationship and incentive relationship is a rewards and punishment mechanism established for supporting the D2D communication business mode. Specifically, an incentive principle is defined for the D2D communication data sharing service released by the terminal or the network; based on the incentive principle, a potential data transmission relay node can choose to undertake or not to undertake data relay service. For example, upon defining relay nodes for some D2D communication sharing service, it can be defined that some kind of rewards can be granted for each 1 Mbis data relay or each 1 minute data relay or each relay data transmission. For example, the rewards can be one of the following, but the disclosure is not limited thereto: enjoy a free relay service for 1 Mbis or 1 minute or one time offered by other users; N virtual integration will be granted for a relay node for each 1 Mbis data relay or each 1 minute data relay or each relay data transmission conducted; and the like. As a result, the incentive problem is well resolved, and the efficiency of data transmission is improved.

The process of choosing to undertake or not to undertake data relay service by the potential data transmission relay node based on the incentive principle can be as follows: the data transmission node sets a gain threshold, and chooses to undertake data relay service if the incentive principle corresponding to the data service meets the gain threshold, otherwise, chooses not to undertake data relay service.

As can be seen through the above description, the potential data transmission relay node can define a gain threshold and is committed to provide relay service if the incentive released by the D2D communication data sharing service meets the gain threshold. The security of data transmission is improved via the setting of the gain threshold.

Preferably, the incentive principle further includes: setting a mutual group, and for any terminal therein, after undertaking a first preset number of times of data relay service, a first preset time of data relay service, or a first preset flow-rate of data relay service for other terminals, the other terminals will undertake a second preset number of times of data relay service, a second preset time of data relay service, or a second preset flow-rate of data relay service for the above-mentioned any terminal.

In this technical scheme, by joining the mutual group, the terminal, as a member of the mutual group, is committed to provide corresponding number of data relay service while obtaining data relay service from other members in the mutual group. For example, a terminal can commit to provide 1 Mbis or N Mbis relay service to other members for every 1 Mbis relay service obtained; or, the terminal can commit to provide 1 minute or N minutes relay service to other members for every 1 minute relay service obtained; or, the terminal can commit to provide one or N relay service to other members for every one relay service obtained. Each terminal in the mutual group is incentivized to transmit data, thus the efficiency of data transmission is improved.

Implementations of the above-mentioned technical schemes include but are not limited to the following exemplary modes:

Example 1

Nodes that are allowed to undertake data relay service (that is, the trusted node) will be added to a white list and/or nodes not allowed to undertake data relay service (that is, the un-trusted node) will be added to a black list. A destination terminal node ("destination terminal" for short) will be selected from the white list; or, it is prohibited to select the destination terminal node from the black list. The destination terminal node will be a data transfer node of a bearer network.

In this example, only the node in the white list is allowed to be used for data transfer/relay, in addition to this or alternatively, the node in the black list is not allowed to be used for data transfer/relay. Thus, the destination terminal can be selected from the white list directly, therefore, working efficiency is improved while the power consumption of the user and operating costs of the operators is saved.

Example 2

The priority of nodes allowed to undertake data relay service will be set according to a setting command received.

The destination node will be selected from the nodes allowed to undertake data relay service according to priority order. The destination node will be a data transfer node of a bearer network.

In this example, based on a priority list defined at the terminal or the network, a node can be selected as a relay node according to the priority order. Therefore, the time it takes to select the relay node can be saved, the working efficiency can be improved, and the power consumption of the user and operating costs of the operators can be saved.

Example 3

The destination node can be selected from the nodes allowed to undertake the data service according to a selecting command received from the user or according to a preset selecting strategy. The destination node will be a data transfer node of the bearer network.

In example 3, the user can choose whether to undertake data relay service according to the service information (such as the quantity and manner of incentive) transmitted via the network. Moreover, the network or the terminal can choose whether to undertake data relay service according to a preset rule and the service information transmitted via the network. For example, if the gain threshold is defined, the user will choose to undertake relay service automatically if the quantity of some service mechanism is higher than the gain threshold.

Figure 4:
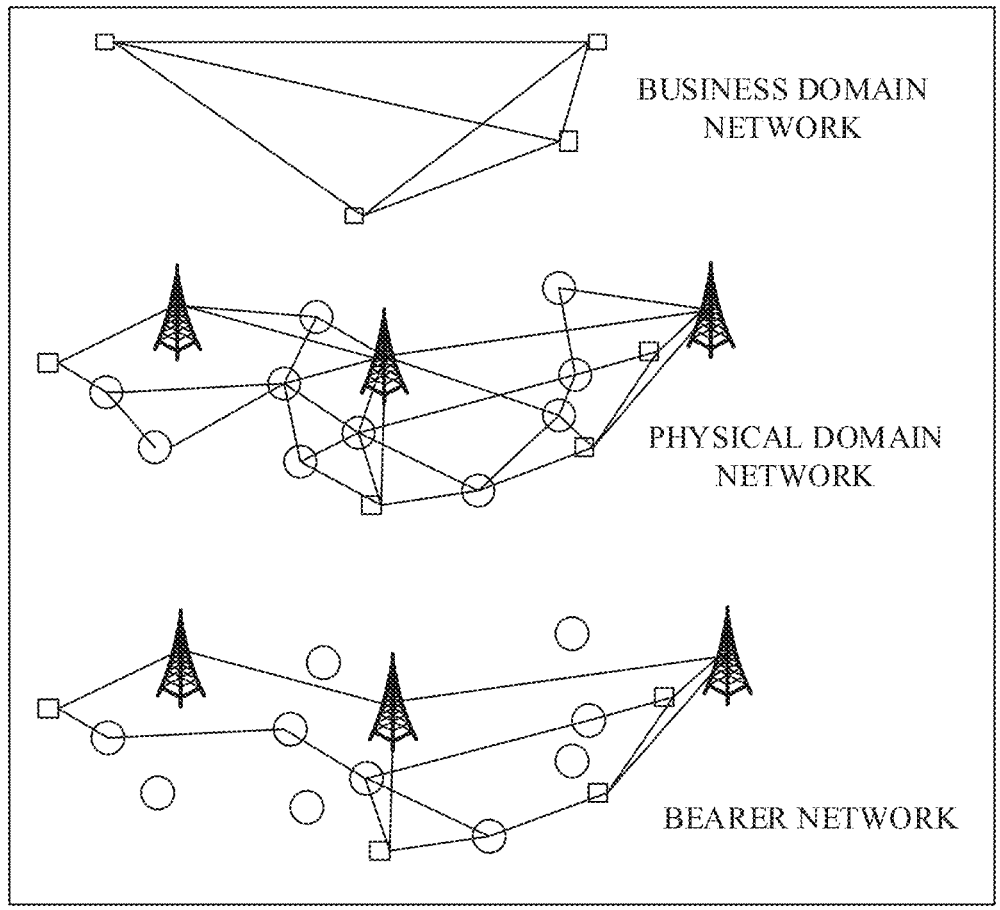
FIG. 4 is a diagram illustrating a D2D communication network model of the data transmission method according to an implementation of the disclosure.

FIG. 4 is a diagram illustrating a D2D communication network model of the data transmission method according to an implementation of the disclosure.

As shown in FIG. 4, the D2D communication network model of the data transmission method according to an implementation of the disclosure includes: a physical domain network, a business mode domain network, and a business domain network, via which a potential business mode and an access restriction method based on physical domain network topological structure can be provided. The above-mentioned three network domains describe D2D communication network establishing manners from three aspects of physical connection, business mode, and upper layer application structure respectively.

Specifically, the physical domain network establishes a bottom D2D communication network which meets some bit-error rate and time delay requirements according to physical characteristics between D2D communication nodes. The business mode domain network performs access control and node selection on the physical domain network according to business mode domain restriction characteristics (such as credit and reciprocity principles) defined so as to form a bearer network which can meet some business mode. The business domain network establishes a logical link network between a data source node and a data-receiving destination node.

Figure 5:
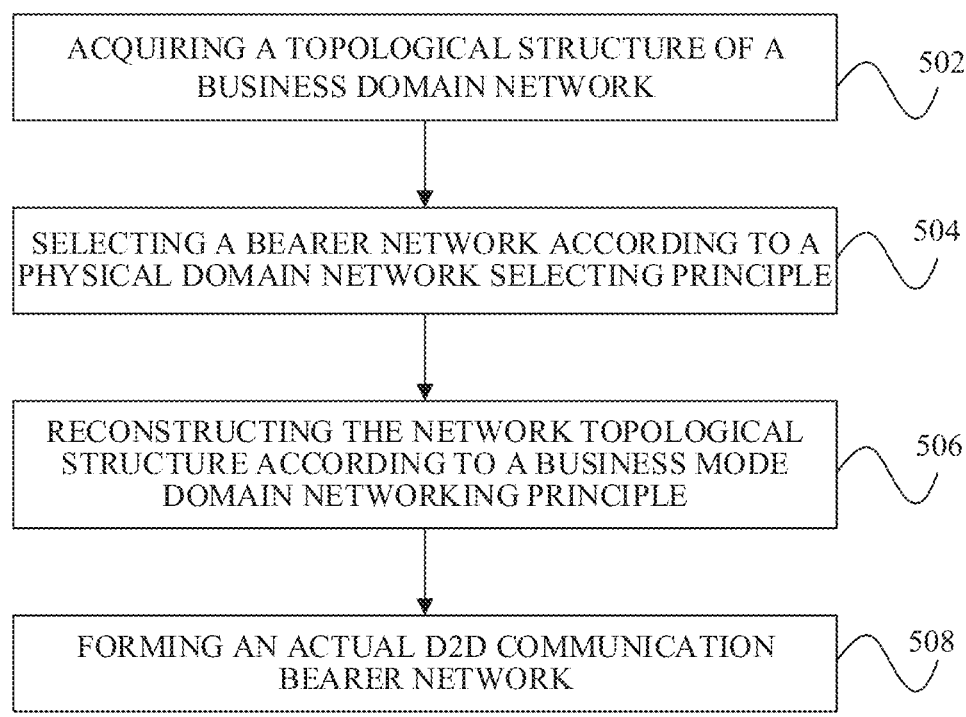
FIG. 5 is a flowchart illustrating D2D communication network limited access according to an implementation of the disclosure.

FIG. 5 is a flowchart illustrating D2D communication network limited access according to an implementation of the disclosure.

As shown in FIG. 5, the process the D2D communication network limited access includes operation 502-operation 508:

Operation 502, acquiring a topological structure of a business domain network according to some mechanism so as to obtain a position relationship between a data source node and a data-receiving node.

Operation 504, selecting a bearer network according to a physical domain network selecting principle, that is to say, selecting a D2D communication network that can achieve a business domain network topological structure.

Operation 506, reconstructing the network topological structure according to a business mode domain networking principle such as a networking principle based on credit and/or a networking principle based on incentive and reciprocity principle.

Operation 508, forming an actual D2D communication bearer network.

In the technical scheme described above, a D2D communication network with a network topological structure that can achieve the target service will be selected via the physical domain network at the first place, and the network topological structure will be reconstructed according to the business mode domain networking principle, then the required D2D communication network can be obtained. As a result, the security of data sharing can be improved and cross-layer optimization between the physical domain network and the business domain network can be achieved.

In addition the manner described above, that is, perform the physical domain network selection first and then perform the business mode domain network selection, the technical scheme of the data transmission method of this disclosure can also be implemented in other manners. For example, perform the business mode domain network selection first, and then perform the physical domain network selection. Certainly, network selection can be performed according to the physical domain and the business mode domain at the same time. Detailed process of network selection will now be described with refer to FIG. 6.

Figure 6:
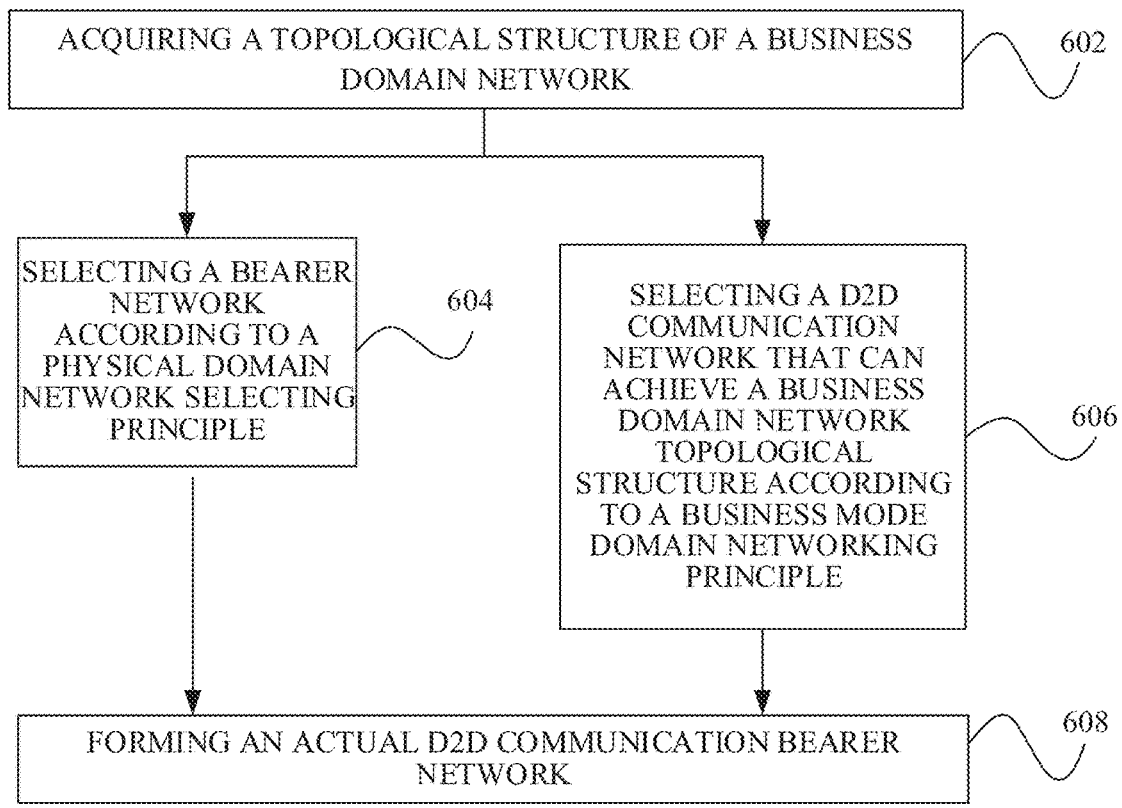
FIG. 6 is a flowchart illustrating D2D communication network limited access according to another implementation of the disclosure.

FIG. 6 is a flowchart illustrating D2D communication network limited access according to another implementation of the disclosure. As shown is FIG. 6, the process includes the following operation 602-operation 608:

Operation 602, acquiring a topological structure of a business domain network according to some mechanism so as to obtain a position relationship between a data source node and a data-receiving node.

Operation 604, selecting a bearer network according to a physical domain network selecting principle, that is to say, selecting a D2D communication network that can achieve a business domain network topological structure.

Operation 606, selecting a D2D communication network that can achieve a business domain network topological structure according to a business mode domain networking principle such as a networking principle based on credit and/or a networking principle based on incentive and reciprocity principle.

Operation 608, forming an actual D2D communication bearer network.

As can be seen from the technical scheme described above, as to the D2D communication network with a network topological structure that can achieve target service, it can be selected via the physical domain network, or, it can be selected according to the networking principle of business mode domain. Furthermore, the data transmission method can also be achieved via a combination of these two above-mentioned manners. Therefore, the security of network data sharing can be improved.

Figure 7:
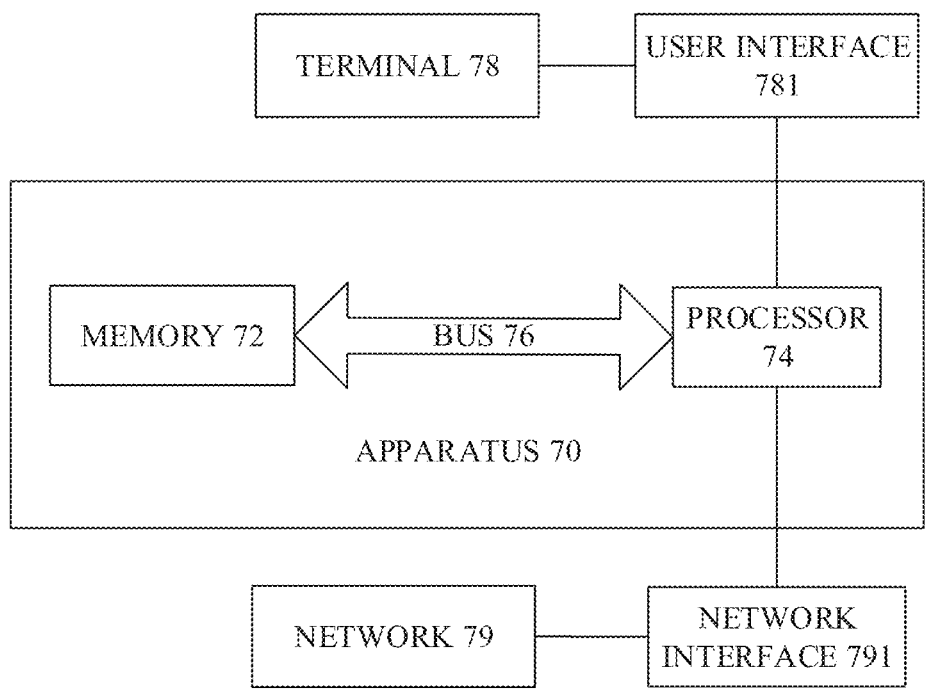
FIG. 7 is a block diagram illustrating an apparatus according to an implementation of the disclosure.

According to another implementation of the present disclosure, it is provided an apparatus. FIG. 7 is a block diagram illustrating the apparatus. As shown in FIG. 7, the apparatus 70 includes a memory 72 and at least one processor 74 (for clarity, only one is illustrated in the figure). Wherein the memory 72 and the processor 74 can be connected in a wired or wireless manner, for example, through a bus 76. For example, the apparatus 70 of the implementation can be a server in communicate with a wireless music system, or, can be a computing device built in the wireless music system.

To be specific, the memory 72 is configured to store computer-readable program code, and can be ROM, RAM, CD-RAM, or any other removable storage medium; the processor 74 is configured to invoke the computer-readable program code stored in the memory 72 to execute predetermined process such as the methods described above, to avoid unnecessarily obscuring the present disclosure, the details of the methods or process will not be provided here. In addition, as shown in FIG. 7, the processor 74 can but not necessarily connect to a terminal 78 through a user interface 781 or to a network 79 through a network interface 791. Alternatively, the processor can also connect to the outside terminal or network in a wireless manner.

According to another implementation of the disclosure, it is provided a computer-readable storage medium configured to store computer-readable program code, when executed on a data-processing apparatus, adapted to perform the methods as described in the above-mentioned implementations.

The computer-readable storage medium may be referred to as a non-volatile computer-readable storage medium or tangible computer-readable medium. Examples of computer-readable storage medium include but are not limited to: magnetic hard disk drive, solid state hard disk, flash memory, USB thumb drive, RAM, ROM, magneto-optical disk, and the register file of the processor.

The term computer readable-storage medium also refers to various types of recording media capable of being accessed by the computer device via a network or communication link. For example, data may be retrieved over a modem, over the internet, or over a local area network. References to a computer-readable storage medium should be interpreted as possibly being multiple computer-readable storage mediums. For example, the computer-readable storage medium can be multiple computer-readable storage medium within the same computer system, or, can be computer readable storage medium distributed among multiple computer systems or computing devices.

Technical schemes of this disclosure have been described with refer to accompanying drawings. Via the technical solution of the disclosure, the trust and incentive problems in D2D communication network can be resolved; moreover, the efficiency of data transmission can be improved and the power consumption of the user and operating costs of the operators can be saved.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method for data transmission, comprising:
determining whether to adopt a Device-to-Device (D2D) communication data transmission manner based on a service request received or triggered by a network side;
based on a determination to adopt the D2D communication data transmission manner, determining a data source node and a data-receiving destination node corresponding to the service request;
selecting a bearer network node corresponding to the data source node and the data-receiving destination node based on a physical domain network selecting principle and at least one of a credit principle and an incentive principle; and
determining a network structure corresponding to the D2D communication data transmission manner based on the bearer network node, the data source node, and the data-receiving destination node,
wherein the credit principle comprises a credit relationship maintained on the network side,
wherein the credit relationship maintained on the network side comprises access control based on at least one of network subscription data and historical data,
wherein when the bearer network node is selected based on the physical domain network selecting principle and the credit principal and when the access control is based on the network subscription data, the method further comprises:
upon network signing of a user of a terminal, determining whether the terminal has been signed and can be used as a relay node for data transmission in a network;
based on a determination that the terminal has been signed and can be used as a relay node for data transmission in the network, defining the terminal as a trusted node; and
based on a determination that the terminal has not been signed and cannot be used as a relay node for data transmission in the network, defining the terminal as an un-trusted node.

2. The method of claim 1, wherein the physical domain network selecting principle comprises at least one of a distance principle and a signal quality principle.

3. The method of claim 2, wherein the credit principle comprises the credit relationship maintained on the network side and a credit relationship maintained on a terminal side.

4. The method of claim 1, wherein when the bearer network node is selected based on the physical domain network selecting principle and the credit principal and when the access control is based on the historical data, the method further comprises:
tracking and recording user behavior of the terminal continuously, and evaluating a credit rating of the user comprehensively according to recorded information, by the network side;
based on a determination that the credit rating meets a preset threshold value, defining the terminal as a trusted node; and
based on a determination that the credit rating does not meet the preset threshold value, defining the terminal as an un-trusted node, by the network side.

5. The method of claim 4, wherein the trusted node is allowed to undertake a data relay service and the un-trusted node is not allowed to undertake the data relay service.

6. The method of claim 4, wherein the method further comprises:
at least one of: adding the trusted node to a white list and adding the un-trusted node to a black list; and
at least one of: selecting a destination terminal node from the white list, and prohibiting to select the destination terminal node from the black list, wherein the destination terminal node will be a data transfer node of a bearer network.

7. The method of claim 4, wherein the method further comprises:
setting priority of the trusted node according to a received setting command; and selecting a destination terminal node from multiple trusted nodes according to a priority order, wherein the destination terminal node will be a data transfer node of a bearer network.

8. The method of claim 4, wherein the method further comprises:
selecting a destination terminal node from multiple trusted nodes according to at least one of: a selecting command received from the user and a preset selecting strategy, wherein the destination terminal node will be a data transfer node of a bearer network.

9. The method of claim 3, wherein the credit relationship maintained on the terminal side comprises a relationship map maintained by terminal side upper applications and a relationship map provided by a network side application server.

10. The method of claim 9, wherein at least one of:
the relationship map maintained by the terminal side upper applications is provided by the terminal side upper applications and is reported to the network side via signaling of an access network signaling plane, whereby the network side will consider access restrictions upon constructing a bearer network; and
the relationship map provided by the network side application server is established by the terminal side upper applications, wherein map synchronization can be achieved between Application layer and the network side application server, and, when constructing the bearer network, the network side requests for the relationship map from the network side application server and access control will be conducted according to acquired relationship map information.

11. The method of claim 1, wherein when the bearer network node is selected based on the physical domain network selecting principle and the incentive principle, the method further comprises:
setting a preset incentive principle for data service by at least one of a terminal side and the network side; and
choosing whether to undertake a data relay service based on the incentive principle by a data transmission node.

12. The method of claim 11, wherein choosing whether to undertake a data relay service based on the incentive principle by a data transmission node comprises:
setting a gain threshold;
choosing to undertake the data relay service when an incentive principle corresponding to the data service meets the gain threshold; and
when the incentive principle corresponding to the data service does not meet the gain threshold, choosing not to undertake the data relay service by the data transmission node.

13. The method of claim 2, wherein when the bearer network node is selected based on the physical domain network selecting principle and the incentive principle, the method further comprises:
setting a mutual group; and
for any terminal within the mutual group, after undertaking at least one of: a first preset number of times of a data relay service, a first preset time of the data relay service, and a first preset flow-rate of the data relay service for other terminals, the other terminals will undertake at least one of a second preset number of times of the data relay service, a second preset time of the data relay service, and a second preset flow-rate of the data relay service for the any terminal within the mutual group.

14. An apparatus, comprising:
a memory; and
one or more processors configured to execute instructions stored in the memory to:
determine whether to adopt a Device-to-Device (D2D) communication data transmission manner based on a service request received or triggered on a network side;
based on a determination to adopt the D2D communication data transmission manner, determine a data source node and a data-receiving destination node corresponding to the service request;
select a bearer network node corresponding to the data source node and the data-receiving destination node based on a physical domain network selecting principle and at least one of a credit principle and an incentive principle; and
determine a network structure corresponding to the D2D communication data transmission manner based on the bearer network node, the data source node, and the data-receiving destination node,
wherein the credit principle comprises a credit relationship maintained on the network side,
wherein the credit relationship maintained on the network side comprises access control based on at least one of network subscription data and historical data,
wherein when the bearer network node is selected based on the physical domain network selecting principle and the credit principal and when the access control is based on the network subscription data, the one or more processors are further configured to execute instructions stored in the memory to:
upon network signing of a user of a terminal, determine whether the terminal has been signed and can be used as a relay node for data transmission in a network;
based on a determination that the terminal has been signed and can be used as a relay node for data transmission in the network, define the terminal as a trusted node; and
based on a determination that the terminal has not been signed and cannot be used as a relay node for data transmission in the network, define the terminal as an un-trusted node.

15. The apparatus of claim 14, wherein the physical domain network selecting principle comprises at least one of a distance principle and a signal quality principle.

16. The apparatus of claim 15, wherein the credit principle comprises the credit relationship maintained on the network side and a credit relationship maintained on a terminal side.

17. The apparatus of claim 14, wherein when the bearer network node is selected based on the physical domain network selecting principle and the credit principal and when the access control is based on the historical data, the one or more processors are further configured to execute instructions stored in the memory to:
track and record user behavior of the terminal continuously, and evaluate a credit rating of the user comprehensively according to recorded information, by the network side;
based on a determination that the credit rating meets a preset threshold value, determine the terminal as a trusted node; and
based on a determination that the credit rating does not meet the preset threshold value, define the terminal as an un-trusted node, by the network side.

18. A non-transitory computer-readable storage medium configured to store computer-readable program instructions, when executed on a data-processing apparatus, adapted to perform a predetermined process of:
- determining whether to adopt a Device-to-Device (D2D) communication data transmission manner based on a service request received or triggered on a network side;
- based on a determination to adopt the D2D communication data transmission manner, determining a data source node and a data-receiving destination node corresponding to the service request;
- selecting a bearer network node corresponding to the data source node and the data-receiving destination node based on at least one of a distance principle and a signal quality principle and at least one of a credit principle and an incentive principle; and
- determining a network structure corresponding to the D2D communication data transmission manner based on the bearer network node, the data source node, and the data-receiving destination node, wherein the credit principle comprises a credit relationship maintained on the network side, wherein the credit relationship maintained on the network side comprises access control based on at least one of network subscription data and historical data, wherein when the bearer network node is selected based on at least one of the distance principle and the signal quality principle and the credit principal and when the access control is based on the network subscription data, the non-transitory computer-readable storage medium is further configured to store computer-readable program instructions, when executed on a data-processing apparatus, adapted to perform a predetermined process of:
- upon network signing of a user of a terminal, determining whether the terminal has been signed and can be used as a relay node for data transmission in a network:
- based on a determination that the terminal has been signed and can be used as a relay node for data transmission in the network, defining the terminal as a trusted node; and
- based on a determination that the terminal has not been signed and cannot be used as a relay node for data transmission in the network, defining the terminal as an un-trusted node.

* * * * *